United States Patent
Bachmutsky

(12) 
(10) Patent No.: US 8,040,860 B2
(45) Date of Patent: Oct. 18, 2011

(54) MOBILE IP SOLUTION FOR COMMUNICATION NETWORKS

(75) Inventor: Alexander Bachmutsky, Sunnyvale, CA (US)

(73) Assignee: Nokia Corporation, Espoo (FI)

(*) Notice: Subject to any disclaimer, the term of this patent is extended or adjusted under 35 U.S.C. 154(b) by 322 days.

(21) Appl. No.: 11/588,939

(22) Filed: Oct. 26, 2006

(65) Prior Publication Data

US 2008/0101315 A1    May 1, 2008

(51) Int. Cl.
*H04W 4/00* (2009.01)
(52) U.S. Cl. .................................. 370/338; 370/328
(58) Field of Classification Search .......... 370/340–344, 370/310.2, 313, 382, 328; 455/41.1, 403
See application file for complete search history.

(56) References Cited

U.S. PATENT DOCUMENTS

| | | | | |
|---|---|---|---|---|
| 5,854,903 | A * | 12/1998 | Morrison et al. | 709/249 |
| 6,549,522 | B1 | 4/2003 | Flynn | 370/313 |
| 6,973,057 | B1 * | 12/2005 | Forslow | 370/328 |
| 7,212,526 | B2 * | 5/2007 | Kanetake | 370/386 |
| 2004/0029555 | A1 | 2/2004 | Tsai et al. | 455/403 |
| 2004/0063402 | A1 | 4/2004 | Takeda et al. | 455/41.1 |
| 2004/0218558 | A1 | 11/2004 | Johansson | 370/313 |
| 2005/0124339 | A1 * | 6/2005 | Lau | 455/432.1 |

FOREIGN PATENT DOCUMENTS

WO    WO-2005074307 A1    8/2005

* cited by examiner

*Primary Examiner* — George Eng
*Assistant Examiner* — Nizar Sivji
(74) *Attorney, Agent, or Firm* — Harrington & Smith

(57) ABSTRACT

Disclosed is a method including supporting multiple IP addresses in a functionality configured to operate as an endpoint of tunnels conveying data, which is destined to mobile nodes; and dynamically assigning the multiple IP addresses for use in mobile nodes. Also corresponding apparatus, computer program and system are disclosed.

25 Claims, 4 Drawing Sheets

MOBILE IP SOLUTION FOR COMMUNICATION NETWORKS

FIELD OF THE INVENTION

The present invention generally relates to mobile IP in communication networks.

BACKGROUND OF THE INVENTION

Mobile IPv4 (Internet Protocol version 4) is in general a protocol enhancement that is designed to allow mobile device users to move from one network to another while maintaining their permanent IP address. That is, mobile IP allows transparent routing of IP datagrams to mobile nodes (MN) in the Internet. Each mobile node is always identified by its home address, regardless of its current point of attachment to the Internet. When situated away from its home, a mobile node is also associated with a care-of address, which provides information about its current point of attachment to the Internet.

There are two kinds of network entities in Mobile IP:
- A home agent (HA) stores information about mobile nodes whose permanent address is in the home agent's network.
- A foreign agent (FA) stores information about mobile nodes visiting its network. Foreign agents also advertise care-of addresses, which are used by Mobile IP.

Data packets are sent to a mobile node using the home address of the mobile node. If the mobile node is situated in a foreign network, these packets are intercepted by the home agent, which tunnels the packets to the mobile node's care-of address with a new IP header, preserving the original IP header. The foreign agent in the foreign network then decapsulates the packets at the end of the tunnel to remove the added IP header and delivers the original packets to the mobile node.

In other words all user traffic has to flow through foreign agent and home agent. In broadband communication networks the amount of such traffic can be significant and may exceed 1 Gbps. However, the most popular physical connection between a foreign agent and a home agent (with potentially multiple hops) is Gigabit Ethernet (GE). That is, the amount of user traffic may exceed capacity of the single link physical connection between a foreign agent and a home agent.

This causes the problem of how to fit the user traffic, which may well constitute multigigabit traffic, into the physical connection between a home agent and a foreign agent.

In order to increase capacity there may be multiple parallel GE links between a home agent and a foreign agent. In general, there are few schemes (all similar) for dividing or balancing load between multiple physical links. One example of such scheme is Equal Cost MultiPath (ECMP) on IP level, another one is Ethernet Link Aggregation (802.3ad) with corresponding Link Aggregation Control Protocol (LACP). The requirement for any such load balancing scheme is preservation of packet order for the same user flow, meaning that all packets for the same user "conversation" (defined usually by 5-tuple—Layer 3 IP source and destination, address, Layer 4 protocol and Layer 4 source and destination ports—or sometimes even more) have to go through the same physical link. Such schemes work well in non-tunneled traffic, because the load balancing can be based either on Layer 2 (MAC address), or Layer 3 (source/destination IP), or even Layer 4 (UDP/TCP ports).

However, in mobile IP all user packets are encapsulated between FA and HA into a tunnel (for example an IP-in-IP tunnel). It means that from point of view of the network devices between FA and HA the entire user traffic (for all mobile subscribers) is a single IP flow or conversation between FA IP address and HA IP address. Thus none of the load balancing schemes can be used, because all layers (L2, L3, and L4) are always the same for all packets inside the tunnel. This results in that the network may be forced to fit the multigigabit mobile IP traffic into single GE link, which clearly causes throughput problems.

It is noted that higher speed links than 1 gigabit links may be available (for example 10 gigabit link may be possible), but such links are expensive and may require optical infrastructure, which is not always available.

Hence, there is a need for a new approach which would avoid and/or mitigate the problems associated with the present solutions.

SUMMARY

According to a first aspect of the invention there is provided a method comprising: supporting multiple IP addresses in a functionality configured to operate as an endpoint of tunnels conveying data, which is destined to mobile nodes; and dynamically assigning the multiple IP addresses for use in the mobile nodes.

The phrase multiple IP addresses refers herein to two or more IP addresses, that is, to more than one IP address. Any suitable number of IP addresses may be used.

In general, dynamic assigning of multiple IP addresses refers herein to that the same IP address is not assigned to all mobile nodes. Instead, one of the IP addresses is assigned to some mobile nodes and another IP address is assigned to some other mobile nodes, for example. One IP address may be assigned to one mobile node only or to a plurality of mobile nodes.

The functionality referred to in the first aspect may be called a foreign agent functionality. The said functionality may be comprised in a foreign agent element of mobile IP or it may concern respective co-located function according to mobile IP.

The dynamically assigned IP address may allow mobile nodes to co-operate with other network entities, such as a home agent, for setting up said tunnels conveying data, which is destined to the mobiles nodes.

Mobile node's home network is the network to which the mobile node's permanent IP address belongs. The functionality referred to in the first aspect is typically used in a visited network, which may be defined as a network other than mobile node's home network. In addition, the said functionality may be deployed even in the home network of a mobile node. For example, the IP address space covered by the home network may be so wide that said functionality is needed for enabling mobile nodes to operate within the whole home network. It is possible that a home network comprises a plurality of subnetworks, and the use of an IP address obtained from one subnetwork in another subnetwork may require the use of the said functionality. The said functionality used in home network may be provided for example by a separate foreign agent element or by a corresponding co-located function. Thus, one may define a foreign network as a network under the said functionality irrespective of whether the foreign network is in a home network or in a visited network.

By supporting multiple IP addresses in a foreign agent functionality (or some other functionality referred to in the first aspect) one achieves that a home agent functionality (or some other corresponding functionality of a home network)

may consider a single foreign agent functionality as multiple foreign agent functionalities. This may result in having multiple tunnels between one home agent and one foreign agent. Thereby it is possible to balance different tunnels to different physical connections between the home agent and foreign agent, whereby capacity between the home agent and foreign agent may be increased without needing to use higher capacity physical links.

In an embodiment of the invention the dynamic assigning of IP addresses is conducted by
dynamically selecting one of the multiple IP addresses; and
sending out an advertisement message comprising the dynamically selected IP address.

In a further embodiment of the invention the advertisement message with the dynamically selected IP address is sent only to mobile nodes not having an assigned IP address.

In a still further embodiment of the invention an advertisement message with corresponding assigned IP address is sent to mobile nodes already having an assigned IP address.

In an embodiment of the invention the advertisement message comprises a list of two or more of said multiple supported IP addresses, the selected IP address being the first one in the list.

The dynamic assigning of the multiple IP addresses may be based on one of the following: random selection, round robin algorithm and weighted round robin algorithm. The weighted round robin algorithm may be based on one of the following: physical link capacity of connections associated with the foreign agent functionality, current tunnel load associated with said multiple IP addresses and mobile node profile.

In an embodiment of the invention, a threshold, which is lower than actual maximum physical link capacity, is taken into account with respect to the physical link capacity.

In another embodiment of the invention, a threshold, which is higher than actual maximum physical link capacity, is taken into account with respect to the physical link capacity.

In an embodiment of the invention the method further comprises:
detecting an overload risk in a tunnel associated with one of the multiple IP addresses; and
relocating one or more mobile nodes, to which said one of the multiple IP addresses is assigned, by assigning a new IP address to said one or more mobile nodes.

According to a second aspect of the invention there is provided an apparatus comprising:
a memory, and
a processor coupled to the memory, the processor being configured to assign an IP address for use in a mobile node, such that the apparatus operates as an endpoint of a tunnel conveying data, which is destined to the mobile node; to support multiple IP addresses; and
to dynamically assign the multiple IP addresses for use in mobile nodes.

The apparatus of the second aspect may be a foreign agent element or an apparatus comprising a co-located foreign agent function.

According to a third aspect of the invention there is provided a computer program stored in a computer readable medium, the computer program comprising computer executable program code adapted to cause an apparatus to implement the first aspect of the invention.

The computer executable program code of the third aspect may consist of program code executable by any one of the following: a multipurpose processor; a microprocessor; an application specific integrated circuit; a digital signal processor; and a master control processor.

According to a fourth aspect of the invention there is provided an apparatus comprising:
means for supporting multiple IP addresses, the apparatus being configured to assign an IP address for use in a mobile node, such that the apparatus operates as an endpoint of a tunnel conveying data, which is destined to the mobile node; and
means for dynamically assigning the multiple IP addresses for use in mobile nodes.

According to a fourth aspect of the invention there is provided a system comprising
a first entity, and
a second entity, wherein the first entity comprises
 a memory, and
 a processor coupled to the memory, the processor being configured
 to intercept data, which is destined to mobile nodes; and
 to tunnel said data to the second entity;
and wherein the second entity comprises
 a memory, and
 a processor coupled to the memory, the processor being configured
 to control the second entity to operate as an endpoint of tunnels conveying data,
which is destined to mobile nodes;
 to support multiple IP addresses; and
 to dynamically assign the multiple IP addresses for use in the mobile nodes.

The system of the fifth aspect may comprise also one or more mobile nodes. The first entity may be for example a home agent and the second entity may be for example a foreign agent.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which.

DETAILED SPECIFICATION

In the following like reference numbers are used to refer to like elements.

Figure 1:
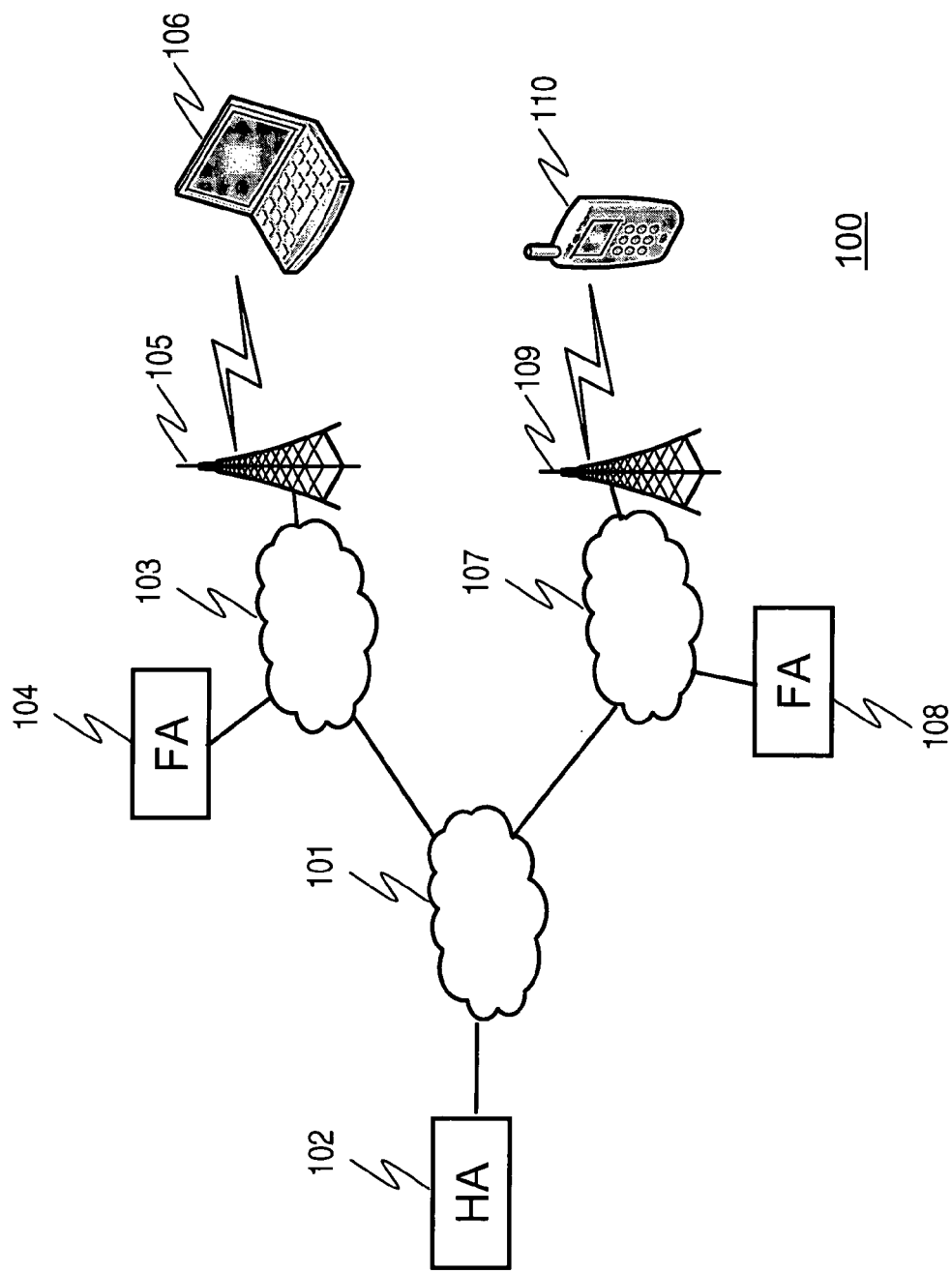
FIG. 1 shows an example of a mobile IP system.

FIG. 1 shows an example of a mobile IP system. The system comprises a home network 101 and two foreign networks 103 and 107. A home agent 102 is located in the home network 101 and two foreign agents 104 and 108 are located in the foreign networks 103 and 107 respectively. A mobile node 106 is connected to the foreign network 103 by means of a radio link provided by a base transceiver station 105 of the foreign network 103 and a mobile node 110 is connected to the foreign network 107 by means of a radio link provided by a base transceiver station 109 of the foreign network 107. Clearly the system may contain also other elements but they are not shown for the sake of clarity.

The mobile nodes 106 and 110 maintain their permanent IP address associated with the home network even when located in a foreign network. When in a foreign network the mobile nodes obtain additionally a care-of-address from a foreign agent and register that care-of-address with their home agent. Then data packets that are destined to mobile node's permanent IP address are intercepted by the respective home agent, which tunnels the packets to the mobile node's care-of address for example with a new IP header, preserving the original IP header. The foreign agent in the foreign network then decapsulates the packets at the end of the tunnel to remove the added IP header and delivers the original packets to the mobile node.

The foreign agent functionality may also be a co-located functionality comprised in a mobile node (not shown in the figure).

Figure 2B:
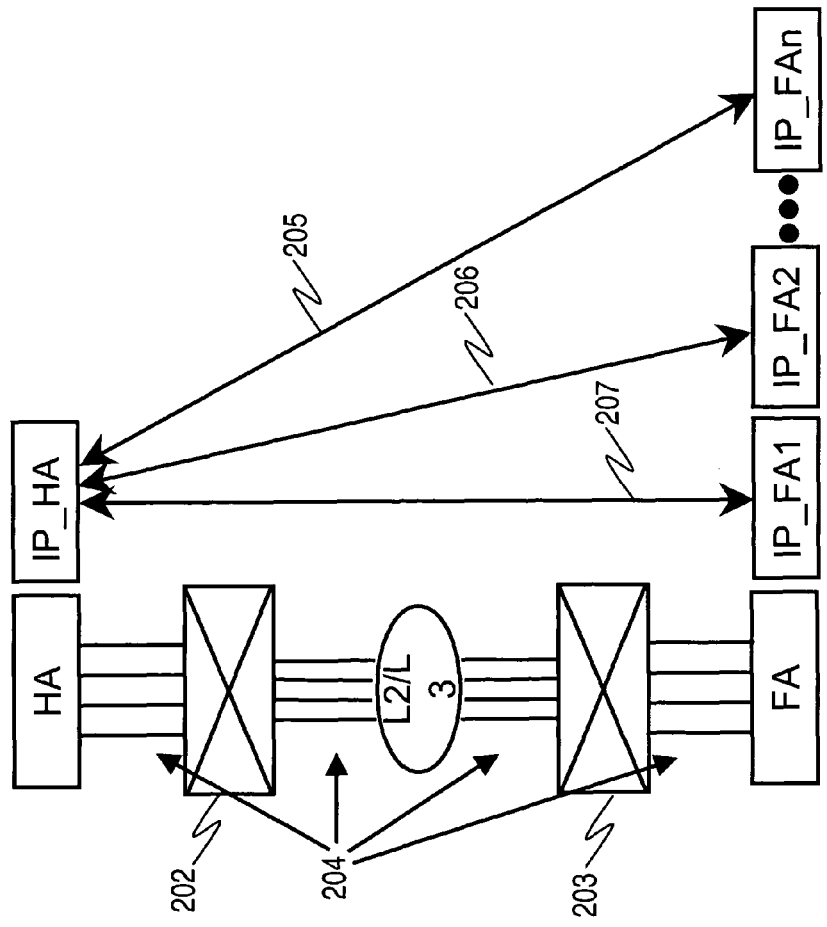
FIG. 2B illustrates tunneled mobile IP traffic between a home agent and multiple IP addresses of a foreign agent.
Figure 2A:
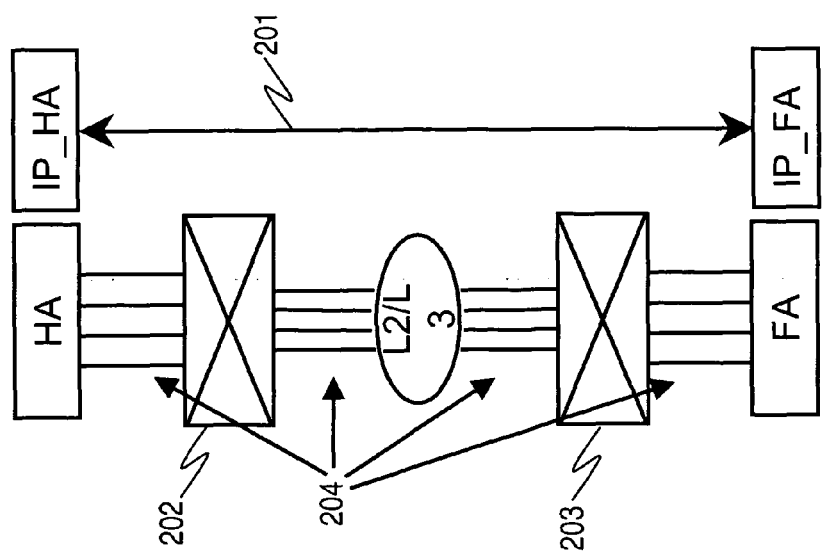
FIG. 2A illustrates tunneled mobile IP traffic between a home agent and a foreign agent.

FIG. 2A illustrates tunneled mobile IP traffic between a home agent and a foreign agent. Conventionally, datagrams destined to all mobile nodes associated with a certain foreign agent have been capsulated in a home agent into a single IP-in-IP tunnel illustrated with arrow 201 in FIG. 2. Thus, network elements 202 and 203, through which the data between the home agent and the foreign agent flows, have seen the mobile IP traffic of plurality of mobile nodes as a single connection 201. For this reason the mobile IP traffic has not been suited for being distributed among different physical connections even though there might have been plurality of parallel physical links 204 available in the path between a home agent and a foreign agent like explained above in connection with prior art.

FIG. 2B illustrates tunneled mobile IP traffic between a home agent and multiple IP addresses of a foreign agent. Now a foreign agent supports multiple IP addresses IP_FA1, IP_FA2 . . . IP_FAn. From home agent point of view such foreign agent with multiple IP addresses may be viewed as multiple foreign agents and thus a separate IP-in-IP tunnel is established for each foreign agent IP address. That is, mobile IP traffic between the home agent and the foreign agent is divided into parallel tunnels 205-207. Clearly, now that there are separate tunnels, the network elements 202 and 203, through which the data between the home agent and the foreign agent flows, see three different connections and therefore are able to balance the load between a plurality of parallel physical links 204.

In summary, by supporting multiple IP addresses in a foreign agent functionality it is possible to force mobile IP traffic into different IP-in-IP tunnels between home agents and foreign agents. In an embodiment of the invention load of each tunnel is further controlled such that the load is not more than the actual capacity of a single physical link (e.g. a GE link) by dynamically assigning the multiple IP addresses for use in different mobile nodes.

To further explain an implementation according to an embodiment of the invention, we can refer to foreign agent discovery mechanism of mobile IP. It starts with an agent advertisement message, which is sent when a mobile node first appears in a foreign network. The message may be sent as a unicast message to a specific mobile node (if known and if the mobile node has an IP address) or as multicast message (to IP address 224.0.0.1) or as broadcast message (to address 255.255.255.255). The agent advertisement message includes an IP address of a foreign agent. In the context of various embodiments of the invention the advertisement message may include either one of the multiple IP addresses supported by a foreign agent or all of the multiple IP addresses or more than one but not all of the multiple IP addresses. These options are further discussed below.

Figure 3A:
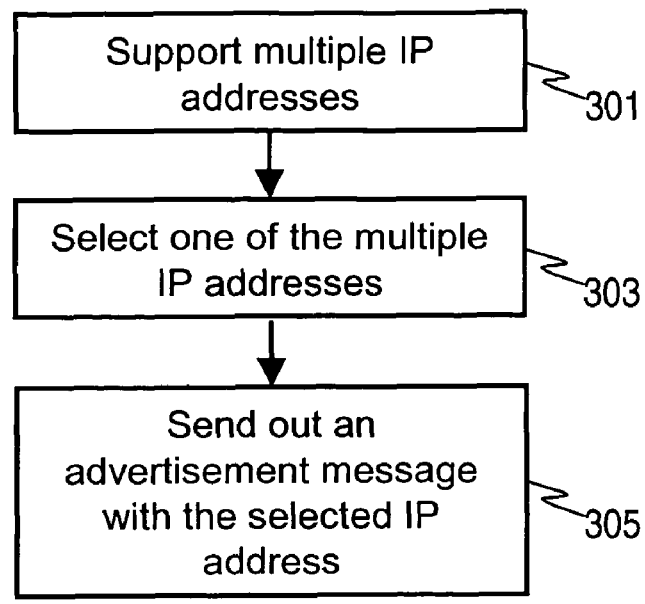
FIG. 3A shows a flow diagram according to an embodiment of the invention.
Figure 3B:
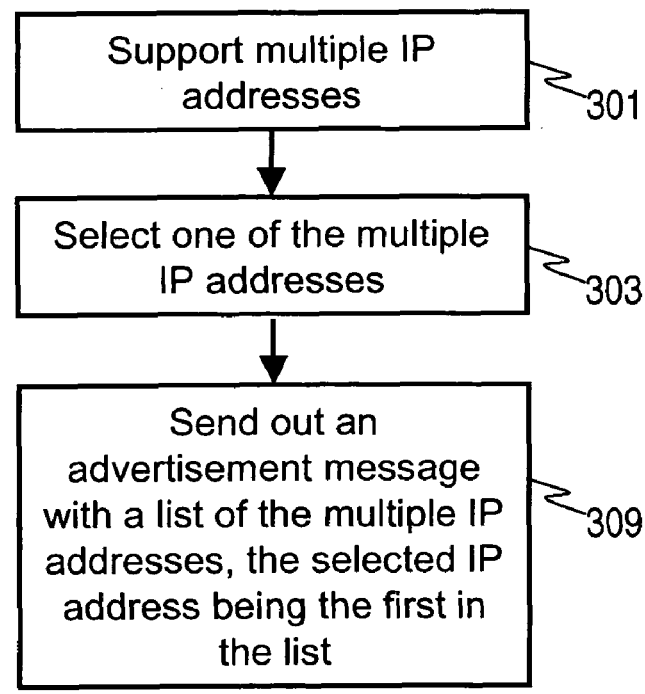
FIG. 3B shows a flow diagram according to another embodiment of the invention.

FIGS. 3A and 3B show flow diagrams according to certain embodiments of the invention. The methods are for use in a foreign agent functionality, which provides an IP address for use in a mobile node, when the mobile node is situated in a foreign network, such that the foreign agent functionality operates as an endpoint of a tunnel conveying data, which is destined to the mobile node.

In phase 301 of FIG. 3A, multiple IP addresses are supported in the foreign agent functionality. Then in phase 303, one of the multiple IP addresses is selected and an advertisement message with that selected IP address is sent out in phase 305.

In mobile IP a mobile node makes its decisions about roaming scenario and/or network change based on the agent advertisement messages. If the IP address advertised by a foreign agent changes, the mobile node will think that the network is changed and will issue a new registration. Thus, in order to avoid unnecessary re-registrations, the same foreign agent IP address should be maintained for a particular mobile node, that is, the advertisement messages should be consistent for the same mobile node.

If one wants to maintain the same advertised IP address for mobile nodes in the method of FIG. 3A, the advertisement message with the selected IP address should be sent in phase 305 only to mobile nodes without already assigned IP address. This is possible to implement in most of broadband cellular networks (for example WiMAX, Worldwide Interoperability for Microwave Access), because a foreign agent (or a corresponding co-located function) has a point-to-point connection to the mobile nodes (GRE, Generic Routing Encapsulation, tunnel and GRE key in case of WiMAX), whereby the foreign agent may select to which mobile nodes an advertisement message is sent and to which it is not sent. Furthermore, mobile IP readily provides that a foreign agent has knowledge on which IP address is assigned to which mobile node, whereby the foreign agent has the necessary information for selecting to which mobile nodes an advertisement message with the selected IP address should not be sent. For the mobile nodes having an assigned IP address, the foreign agent may send an advertisement message with the corresponding assigned IP address.

Like in FIG. 3A, also in FIG. 3B multiple IP addresses are supported in the foreign agent functionality in phase 301 and one of the multiple IP addresses is selected in phase 303. Then an advertisement message comprising a list of two or more of said multiple supported IP addresses is sent out in phase 309. The selected IP address is set to be the first one in the list. It should be appreciated that the advertisement message of phase 309 may contain all IP addresses supported by the foreign agent functionality or only some of the IP addresses. Alternatively or additionally, a desired order may be selected for the whole list of IP addresses comprised in an advertisement message. It should be noted though, that it is not mandatory to order the rest of the list except for setting the desired IP address to be the first one in the list. Further it should be appreciated that mobile IP specifications readily allow including multiple foreign agent IP addresses in an advertisement message.

Now, maintaining the same advertised IP address for a certain mobile nodes is in principle automatically provided in the method of FIG. 3B. According to mobile IP, if a mobile node receives an advertisement message including the foreign agent IP address that is currently assigned to it (the address the mobile node has registered with its home agent), it will not make any changes irrespective of other IP addresses possibly included in the advertisement message. On the other hand, if a mobile node does not yet have an assigned IP address, the mobile node should, according to mobile IP, pick the first IP address listed in an advertisement message. Thus, sending advertisement messages to all mobile nodes does not disturb mobile nodes having an already assigned IP address, and an appropriate IP address may be assigned to new mobile nodes by ordering the multiple IP addresses such that the IP address to be assigned to new mobile nodes is the first IP address listed in an advertisement message. In other words, in this option a foreign agent may control load on different tunnels by varying the first IP addresses in an IP address list of an advertisement message. This option may be applicable to any type of the network and connectivity between a foreign agent and a mobile node.

The selection of one of the multiple IP addresses in phase 303 may be based on random selection, round robin algorithm or weighted round robin algorithm for example. Also any other suitable selection method can be used within the scope of the invention.

If simple round robin algorithm is used, the next IP address in a continuous loop is always selected, that is, the next IP address in a continuous loop is assigned for use in every other mobile node. Such algorithm may work well for example with very large number of mobile nodes and/or similar subscription and usage pattern for most mobile nodes. A good result is achieved based on even statistical distribution principle.

It should be noted however, that if strict round robin algorithm is used, it is possible that a group of mobile nodes having the same assigned IP address becomes simultaneously more active, whereby the tunnel associated with that IP address may require more throughput than single physical link can provide.

Weighted round robin algorithm may suit better for a situation where even statistical distribution cannot be assumed in subscriptions and usage of mobile nodes. The algorithm may take into account for example bandwidth available for a particular IP address (based on aggregated subscription information or real-time or projected traffic throughput) and subscription information or projected traffic throughput or some other available profile information for the mobile node to be added. Such subscription information and/or some other profile information may be available from the mobile node's access authentication phase that happens in mobile IP before foreign agent advertisement.

Also with weighted round robin algorithm it is possible that at some point of time the tunnel associated with an IP address requires more throughput than single physical link can provide. The reason for this may be for example that real-time or projected traffic parameters are used as the weight for the algorithm and the traffic pattern changes over the time such that the original weight definition is not valid anymore. For this reason in an embodiment of the invention the weighted round robin algorithm takes into account a lower threshold than maximum physical link capacity in order to account for traffic bursts that may be caused for example by changes in traffic patterns of mobile nodes.

On the other hand, the tunnel associated with an IP address may become also under-utilized, if subscription information is used as the weight for the algorithm, because subscription information typically provides only maximum levels of traffic, while mobile node's actual traffic is on average much lower. In such scenario "oversubscription" of the IP address may be used with potentially configurable oversubscription levels. That is, more mobile nodes may be assigned for one IP address than appears recommendable on the basis of the algorithm or the algorithm is configured to consider higher throughput than one physical link can actually provide. However, such oversubscription might also cause overload in some cases.

Figure 4:
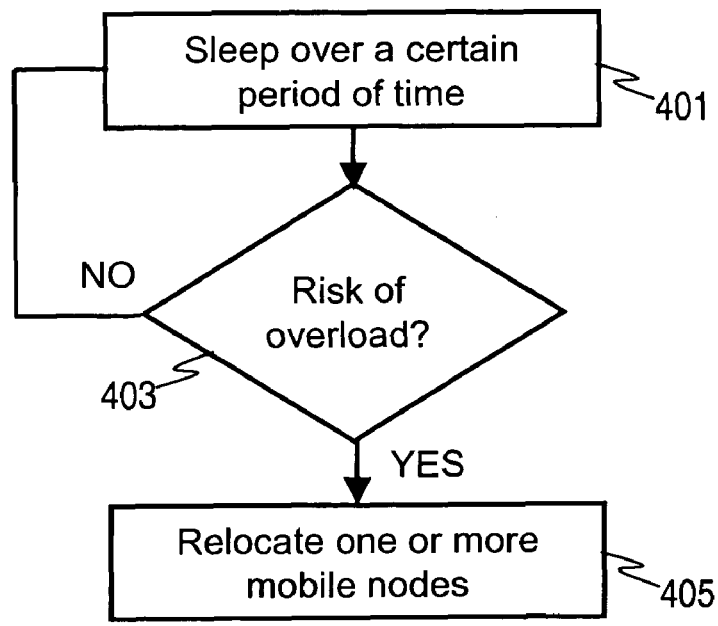
FIG. 4 shows a flow diagram according to yet another embodiment of the invention.

In an embodiment of the invention the foreign agent functionality is configured to detect a risk of overloading an IP address/a tunnel associated with certain IP address (for example the load in one tunnel exceeds a configurable throughput threshold), and to relocate one or more mobile node(s) from the IP address in the question to a new IP address. Such method is illustrated in flow diagram of FIG. 4. First the procedure sleeps over a certain period of time in phase 401, that is, the procedure of checking whether any relocations are needed is repeated periodically. Then it is checked, if there is a risk of overload for certain IP address/tunnel associated with the IP address in phase 403. If no risk is detected, the procedure returns to phase 401 and continues from there on. If a risk is detected, one or more mobile nodes are relocated to a new IP address in phase 405. Any suitable method can be used for selecting the new IP address. The relocation can be effected for example by sending to appropriate mobile nodes an agent advertisement message with the new IP address. The advertisement message used for relocating purposes may comprise one or more IP addresses, but it should not include the IP address that was previously assigned to the mobile node to be relocated. Like mentioned above, a mobile node may carry out a re-registration in response to an advertisement message, which does not include the IP address that was previously assigned to it. Thus excluding the previously assigned IP address from the advertisement message effectively forces a mobile node to take into use a new IP address. The mobile nodes that are not actively sending/receiving data may be relocated first.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Figure 5:
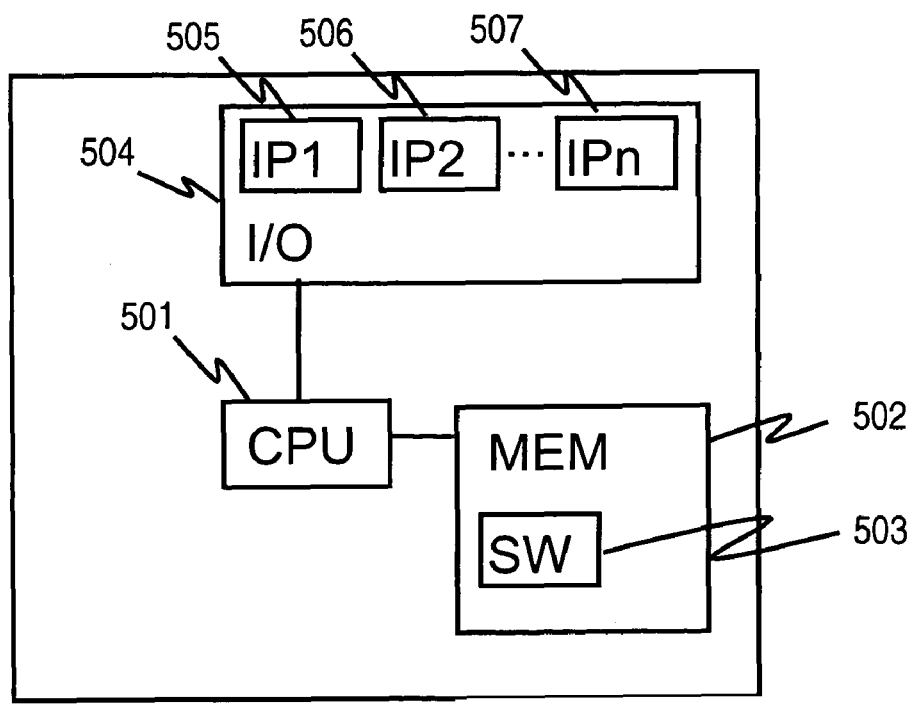
FIG. 5 shows a block diagram of an apparatus suited for carrying out various embodiments of the invention.

FIG. 5 shows a block diagram of an apparatus suited for carrying out various embodiments of the invention. The apparatus 500 may be a typical computer, such as a general-purpose computer or a server, with possibly distributed functions, that comprises a Central Processing Unit (CPU) 501 for controlling the computer, a memory 502 including a computer program code or software 503. The software 503 includes instructions for the CPU 501 to control the apparatus 500 such as an operating system and different computer applications. The software 503 may comprise instructions for controlling the apparatus to provide the functionality of the invention. The apparatus 500 further comprises an I/O (input/output) unit 504 such as a LAN or WLAN receiver/transmitter. The I/O unit comprises plurality of IP interfaces 505-507 having different IP addresses. The apparatus 500 could comprise also a user interface (not shown), but the user interface may be implemented also by means of a remote connection through the I/O unit or the user-interface may be non-existent.

It should be appreciated that in this document, words comprise, include and contain are each used as open-ended expressions with no intended exclusivity. Further the terms foreign agent and foreign agent functionality are used interchangeably and may refer both to separate foreign agent element and to a corresponding co-located function.

The foregoing description has provided by way of non-limiting examples of particular implementations and embodiments of the invention a full and informative description of the best method and apparatus presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention could be used to advantage without the corresponding use of other features. As such, the foregoing description should be considered as merely illustrative of the principles of the present invention, and not in limitation thereof. Hence, the scope of the invention is only restricted by the appended patent claims.

The invention claimed is:

1. A method comprising:
    supporting multiple internet protocol addresses of a foreign network entity in a foreign network, the foreign network entity configured to receive data from a home network entity, the received data being divided between different simultaneous tunnels of a plurality of tunnels established between the foreign network entity and the home network entity, each tunnel having an associated address selected from the multiple internet protocol addresses, where the foreign network entity operates as an endpoint for the different simultaneous tunnels of the plurality of tunnels, and where the received data is destined for mobile nodes in the foreign network; and
    dynamically assigning each of the multiple internet protocol addresses to one or more of the mobile nodes in the foreign network for registration at the home network entity as tunnel endpoint addresses for the data destined for the mobile nodes; and
    controlling, with the foreign network entity, a load of the data divided between the different simultaneous tunnels of the plurality of tunnels by the dynamic assignment of the multiple internet protocol addresses, where the dynamic assignment comprises assigning the multiple internet protocol addresses so as not to overload any of the different simultaneous tunnels.

2. The method according to claim 1, wherein said dynamic assigning is conducted by
    dynamically selecting one of said multiple internet protocol addresses; and
    sending out an advertisement message comprising said dynamically selected internet protocol address.

3. The method according to claim 2, further comprising sending said advertisement message with said dynamically selected internet protocol address only to mobile nodes not having an assigned internet protocol address.

4. The method according to claim 2, further comprising sending, to mobile nodes having an assigned internet protocol address, an advertisement message with a corresponding assigned internet protocol address.

5. The method according to claim 2, wherein said advertisement message comprises a list of two or more of said multiple supported internet protocol addresses, the selected internet protocol address being the first one in the list.

6. The method according to claim 1, wherein the dynamic assigning of the multiple internet protocol addresses is based on one of the following: random selection, round robin algorithm and weighted round robin algorithm.

7. The method according to claim 6, wherein the weighted round robin algorithm is based on one of the following: physical link capacity of connections associated with the foreign agent functionality, current tunnel load associated with said multiple internet protocol addresses and mobile node profile.

8. The method according to claim 7, wherein a threshold, which is lower than actual maximum physical link capacity, is taken into account with respect to the physical link capacity for the weighted round robin algorithm.

9. The method according to claim 7, wherein a threshold, which is higher than actual maximum physical link capacity, is taken into account with respect to the physical link capacity for the weighted round robin algorithm.

10. The method according to claim 1, further comprising:
    detecting an overload risk in a tunnel associated with one of the multiple internet protocol addresses; and
    relocating one or more mobile nodes, to which said one of the multiple internet protocol addresses is assigned, by assigning a new internet protocol address to said one or more mobile nodes.

11. The method according to claim 1, wherein the foreign network entity comprises a foreign agent.

12. An apparatus comprising:
    at least one processor; and
    at least one memory including computer program code, where the at least one memory and the computer program code are configured, with the at least one processor, to cause the apparatus to at least:
    support multiple internet protocol addresses of a foreign network entity in a foreign network;
    receive data from a home network entity, the received data being divided between different simultaneous tunnels of a plurality of tunnels established between the foreign network entity and the home network entity, each tunnel having an associated address selected from the multiple internet protocol addresses, where the foreign network entity operates as an endpoint for the different simultaneous tunnels of the plurality of tunnels, and where the received data is destined for mobile nodes in the foreign network;
    dynamically assign each of the multiple internet protocol addresses to one or more of the mobile nodes for registration at the home network entity as tunnel endpoint addresses for the data destined for the mobile nodes; and
    control, with the foreign network entity, a load of the data divided between different simultaneous tunnels of the plurality of tunnels by the dynamic assignment of the multiple internet protocol addresses, where the dynamic assignment comprises assigning the multiple internet protocol addresses so as not to overload any of the different simultaneous tunnels.

13. The apparatus according to claim 12, wherein the dynamic assignment comprises
    dynamically selecting one of said multiple internet protocol addresses; and
    sending out an advertisement message comprising said dynamically selected internet protocol address.

14. The apparatus according to claim 13, wherein said advertisement message with said dynamically selected internet protocol address is sent only to mobile nodes not having an assigned internet protocol address.

15. The apparatus according to claim 13, wherein an advertisement message with a corresponding assigned internet protocol address is sent to mobile nodes having an assigned internet protocol address.

16. The apparatus according to claim 13, wherein the advertisement message comprises a list of two or more of said multiple supported internet protocol addresses, the selected internet protocol address being the first one in the list.

17. The apparatus according to claim 12, wherein the dynamic assigning of the multiple internet protocol addresses is based on one of the following: random selection, round robin algorithm and weighted round robin algorithm.

18. The apparatus according to claim 17, wherein the weighted round robin algorithm is based on one of the following: physical link capacity of connections associated with the foreign agent functionality, current tunnel load associated with said multiple internet protocol addresses and mobile node profile.

19. The apparatus according to claim 18, wherein the at least one computer program and the at least one memory, with the at least one processor, is configured to cause the apparatus to take into account, for the weighted round robin algorithm, a threshold with respect to the physical link capacity which is lower than actual maximum physical link capacity.

20. The apparatus according to claim 18, wherein the at least one computer program and the at least one memory, with the at least one processor, is configured to cause the apparatus to take into account, for the weighted round robin algorithm, a threshold with respect to the physical link capacity which is higher than actual maximum physical link capacity.

21. The apparatus according to claim 12, wherein the at least one computer program and the at least one memory, with the at least one processor, is configured to cause the apparatus
- to detect an overload risk in a tunnel associated with one of the multiple internet protocol addresses; and
- to relocate one or more mobile nodes, to which said one of the multiple internet protocol addresses is assigned, by assigning a new internet protocol address to said one or more mobile nodes.

22. The apparatus according to claim 12, wherein the apparatus comprises a foreign agent element.

23. A computer program stored in a computer readable memory, the computer program comprising computer executable program code adapted to cause an apparatus to perform the method of claim 1.

24. The method according to claim 1, wherein the dynamic assignment comprises assigning the multiple internet protocol addresses in order to assign the one or more of the mobile nodes to the different simultaneous tunnels of the plurality of tunnels.

25. The apparatus according to claim 12, wherein the dynamic assignment comprises the at least one computer program and the at least one memory, with the at least one processor, is configured to cause the apparatus to assign the multiple internet protocol addresses in order to assign the one or more of the mobile nodes to the different simultaneous tunnels of the plurality of tunnels.

\* \* \* \* \*